(12) United States Patent
Huang

(10) Patent No.: US 7,072,998 B2
(45) Date of Patent: Jul. 4, 2006

(54) METHOD AND SYSTEM FOR OPTIMIZED FIFO FULL CONDUCTION CONTROL

(75) Inventor: Hsilin Huang, Milpitas, CA (US)

(73) Assignee: Via Technologies, Inc., Taipei (TW)

( * ) Notice: Subject to any disclaimer, the term of this patent is extended or adjusted under 35 U.S.C. 154(b) by 55 days.

(21) Appl. No.: 10/436,822

(22) Filed: May 13, 2003

(65) Prior Publication Data

US 2004/0230715 A1 Nov. 18, 2004

(51) Int. Cl.
*G06F 3/00* (2006.01)

(52) U.S. Cl. .............................. 710/57; 710/52; 710/53; 710/55; 710/56

(58) Field of Classification Search ................ 710/57, 710/52, 56, 53, 55; 365/189.07, 239

See application file for complete search history.

(56) References Cited

U.S. PATENT DOCUMENTS

| 5,379,399 | A | * | 1/1995 | Conway-Jones et al. ..... 711/109 |
| 5,386,513 | A | * | 1/1995 | Tengan ......................... 710/53 |
| 5,809,324 | A | * | 9/1998 | Yung ............................ 712/23 |
| 6,044,457 | A | * | 3/2000 | Mantor et al. .............. 712/223 |
| 6,480,942 | B1 | * | 11/2002 | Hirairi .......................... 710/56 |
| 6,658,505 | B1 | * | 12/2003 | Jin et al. ...................... 710/52 |

OTHER PUBLICATIONS

Cache Circuitry and Operation, www.pcguide.com/ref/hdd/op/cascheCircuitry-c.html, no date.*

* cited by examiner

*Primary Examiner*—Tanh Q. Nguyen
(74) *Attorney, Agent, or Firm*—Fernandez & Associates, LLP

(57) ABSTRACT

Method and system for generating an optimized full signal in a FIFO device. In one embodiment of the present invention, the optimized full signal control circuit checks the storage capacity of the FIFO memory by aggregating the number of occupied word entries and the number of occupied pipelines.

3 Claims, 3 Drawing Sheets

Figure 1 *(Prior Art)*

METHOD AND SYSTEM FOR OPTIMIZED FIFO FULL CONDUCTION CONTROL

BACKGROUND OF INVENTION

1. Field of Invention

The present invention relates generally to computer systems. More particularly, the present invention relates to an optimized control circuit for generating a full signal in a First In First Out (FIFO) device.

2. Related Art

Data transfer in computer systems is typically conducted between a sending element and a receiving element according to a handshake protocol. In computer systems, data is often transmitted from the sending element at a higher rate than it can be consumed at the receiving element. In order to facilitate data communication between the sending element and the receiving element, high-speed buffers such as First In First Out (FIFO) memory devices are used.

A FIFO device typically comprises a plurality of serially arranged storage cells (or memory locations) which are sequentially written into and read from. A write address pointer holds the write binary address of the storage cell into which data will be written during the next write operation, and a read address pointer holds the read binary address of the storage cell from which data will be read during the next read operation.

FIG. 1 illustrates a conventional FIFO device 100. FIFO device 100 comprises: a FIFO memory element 101, a write address circuit 103, a write multiplexer 105, a read address circuit 107, a read multiplexer 109, an up-down counter 111, and a FULL/EMPTY signal generator 113. Moreover, memory element 101 may be a RAM (Random Access Memory) in which reading and writing of data may be performed simultaneously and comprises a capacity of N words. While a read permission signal (RE) is asserted, data (RDATA) is read from an address designated by a read address (RADR) on a word-by-word basis at a clock timing of a clock signal CLK. Similarly, while a write permission signal (WE) is asserted, data (WDATA) is written into an address designated by a write address (WADR) on a word-by-word basis at a clock timing of the clock signal CLK.

The read address circuit 107 receives the clock signal CLK and the read permission signal (RE). While the read permission signal (RE) is asserted, the read address circuit 107 increments the read address (RADR) by one at a clock timing of the clock signal CLK.

The write address circuit 103 receives the clock signal CLK and the write permission (WE). While the write permission signal (WE) is asserted, the write address circuit 103 increments the write address (WADR) by one at a clock timing of the write clock signal CLK.

When up-down counter 111 receives an asserted write enable (WE) signal, the counter enables a count-up signal (U) which allows a count-up operation. Moreover, when up-down counter 111 receives an asserted read enable (RE) signal, the counter enables a count-down signal (D) which allows a count-down operation. While one of the count-up enable signal (U) or the count-down enable signal (D) is asserted, the up-down counter 111 performs a count operation at a clock timing of the clock CLK. A count value count of the up-down counter 111 is output to FULL/EMPTY signal generator 113.

Signal generator 113 receives the count value count from up-down counter 111. If the received count value count is 0, the signal generator 113 outputs an empty signal E, indicating that memory 101 has no data to be read.

In one embodiment of a conventional FIFO device, pipelines are not used in conjunction with the FIFO device. In this embodiment, if the received count value count equals N (the number of words available in memory 101), signal generator 113 outputs a full signal F, indicating that memory 101 has no more storage capacity available.

In an alternate embodiment of a conventional FIFO device, pipelines are used in conjunction with the FIFO device. In this alternate embodiment, assuming M number of pipelines are used wherein each pipeline is capable of storing one data word, if the received count value count equals N (the number of words available in memory 101)—M (the maximum number of words stored in the pipelines), signal generator 113 outputs a full signal F, indicating that memory 101 has no more storage capacity available. As an illustrative example, FIFO memory 101 in FIG. 1 receives data from 5 pipelines denoted Pipeline0, Pipeline1, Pipeline2, Pipeline3, and Pipeline4. In this example, signal generator 113 generates a full signal F if count equals to N−5.

The conventional FIFO device illustrated in FIG. 1 may be used to facilitate the data rate discrepancy between the sending element and the receiving element. However, such conventional FIFO devices do not take into consideration possible idle pipelines that do not contain any data, and therefore may generate a full signal while the FIFO memory is still capable of storing additional data.

SUMMARY OF INVENTION

Accordingly, the present invention provides a method and a system for generating an optimized full signal in a FIFO device. In one embodiment of the present invention, each of one or more pipelines from which a FIFO device obtains data is checked for valid data entry. For each pipeline, a corresponding validity bit is set to zero if the pipeline contains no data and the corresponding validity bit is set to one if the pipeline contains a valid data entry. Moreover, a count value count (shown in FIG. 1) is then aggregated with the validity bits in order to generate a total sum. The sum is compared to the storage capacity of the FIFO memory, and a full signal is generated if the two values equal.

The FIFO full signal control circuit of the present invention allows more optimized use of FIFO memory storage by generating full signals according to occupied pipelines rather than counting all pipelines indiscriminatingly.

BRIEF DESCRIPTION OF DRAWINGS

The accompanying drawings that are incorporated in and form a part of this specification illustrate embodiments of the invention and together with the description, serve to explain the principles of the invention.

DETAILED DESCRIPTION OF EXEMPLARY EMBODIMENT (S)

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 2:
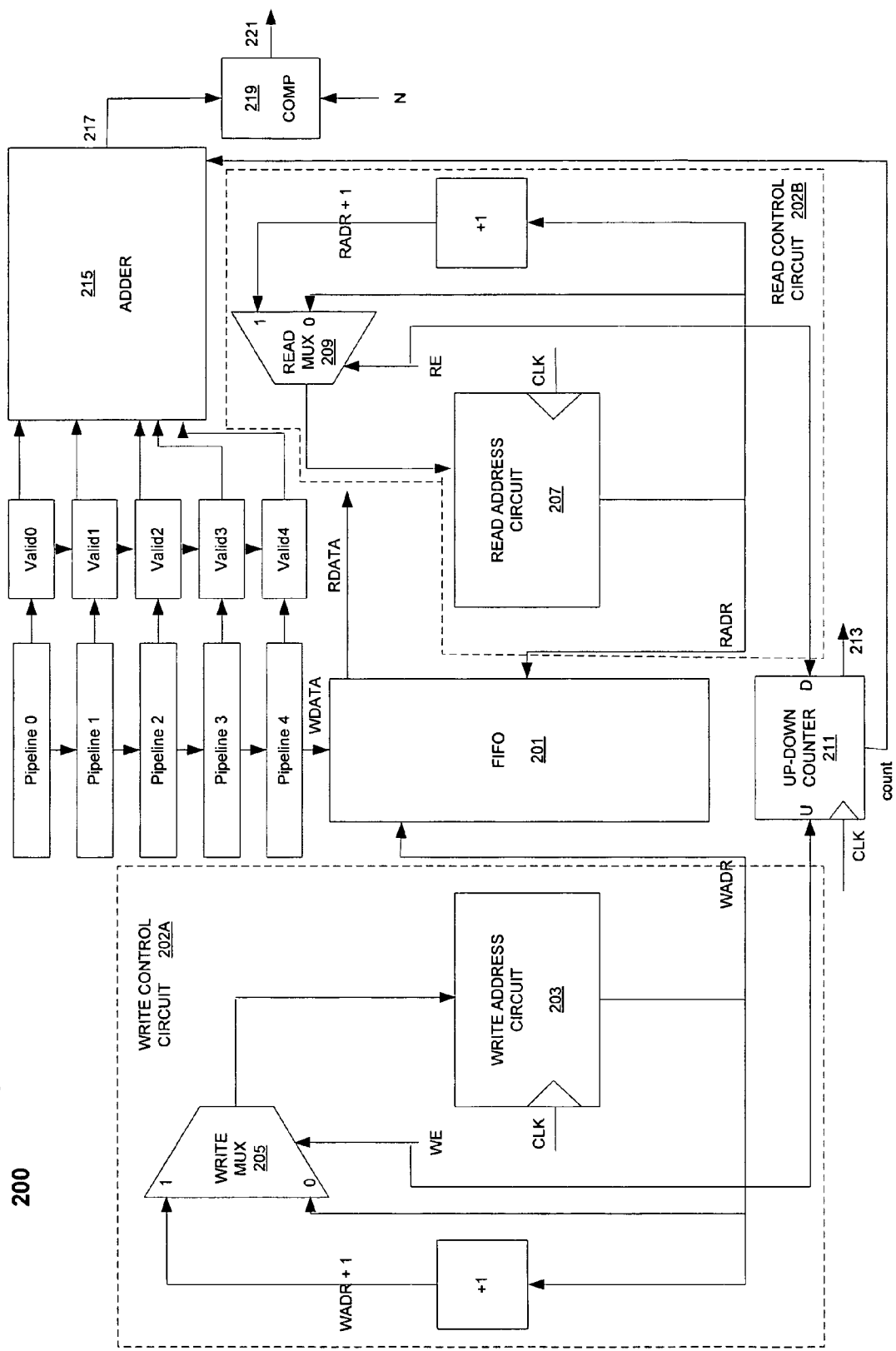
FIG. 2 is an architectural diagram illustrating a FIFO device comprising an optimized full signal control circuit in accordance to one embodiment of the present invention.

FIG. 2 illustrates a FIFO device 200 according to one embodiment of the present invention. FIFO device 200 comprises: a FIFO memory element denoted 201, a write control circuit denoted 202A, a read control circuit denoted 202B, an up-down counter denoted 211, an adder denoted 215, and a comparator denoted 219. Memory element 201 may be a RAM (Random Access Memory) in which reading and writing of data may be performed simultaneously and comprises a capacity of N words.

Write control circuit 202A further comprises a write address circuit denoted 203 and a write multiplexer denoted 205. While a write permission signal (WE) is asserted, data (WDATA) is written into an address designated by a write address (WADR) on a word-by-word basis at a clock timing of a clock signal CLK.

During a write operation, write control circuit 202A receives the clock signal CLK and the write permission (WE). While the write permission signal (WE) is asserted, the write address circuit 203 increments the write address (WADR) by one at a clock timing of the clock signal CLK. Moreover, while the write permission signal (WE) and the clock signal CLK are asserted, multiplexer 205 selects input "1" in order to increment the write address (WADR) by one.

Read control circuit 202B further comprises a read address circuit denoted 207 and a read multiplexer denoted 209. While a read permission signal (RE) is asserted, data (RDATA) is read from an address designated by a read address (RADR) on a word-by-word basis at a clock timing of the write clock signal CLK.

During a read operation, read control circuit 202B receives the clock signal CLK and the read permission (RE). While the read permission signal (RE) is asserted, the read address circuit 207 increments the read address (RADR) by one at a clock timing of the clock signal CLK. Moreover, while the read permission signal (RE) and the clock signal CLK are asserted, multiplexer 209 selects input "1" in order to increment the read address (RADR) by one.

Furthermore, when up-down counter 211 receives an asserted write enable (WE) signal, the counter enables a count-up signal (U) which allows a count-up operation. When up-down counter 211 receives an asserted read enable (RE) signal, the counter enables a count-down signal (D) which allows a count-down operation. While one of the count-up enable signal (U) or the count-down enable signal (D) is asserted, the up-down counter 211 performs a count operation at a clock timing of the clock CLK. A count value count of the up-down counter 211 is then output to adder 215.

In the embodiment shown in FIG. 2, FIFO memory 201 receives data WDATA from five pipelines denoted Pipeline0, Pipeline1, Pipeline2, Pipeline3, and Pipeline4, each pipeline having a storage capacity of one data word. The pipelines Pipeline0, Pipeline1, Pipeline2, Pipeline3, and Pipeline4 further correspond to validity bits held in registers Valid0, Valid1, Valid2, Valid3, and Valid4 respectively. A validity bit is set to zero if its corresponding pipeline does not contain any data. Conversely, a validity bit is set to one if its corresponding pipeline contains a valid data entry. The pipelines Pipeline0, Pipeline1, Pipeline2, Pipeline3, and Pipeline4 are connected in series and the data stored in a first pipeline is piped to the next pipeline at each clock cycle as shown by the arrows interconnecting each pipeline to the next and ultimately to FIFO memory 201. Similarly, as the data is piped from one pipeline to the next, the validity bit corresponding to the data is piped from one validity register to the next as shown by the arrows interconnecting each validity register to the next.

Furthermore, the values of the validity bits are input to adder 215 and aggregated with output of up-down counter 211 denoted count. The adder then outputs an aggregated sum denoted 217. Comparator 219 takes as input sum 217 and N (the number of words available in FIFO memory 201), compares the two input values, and output a full signal if the two input values equal.

Figure 3:
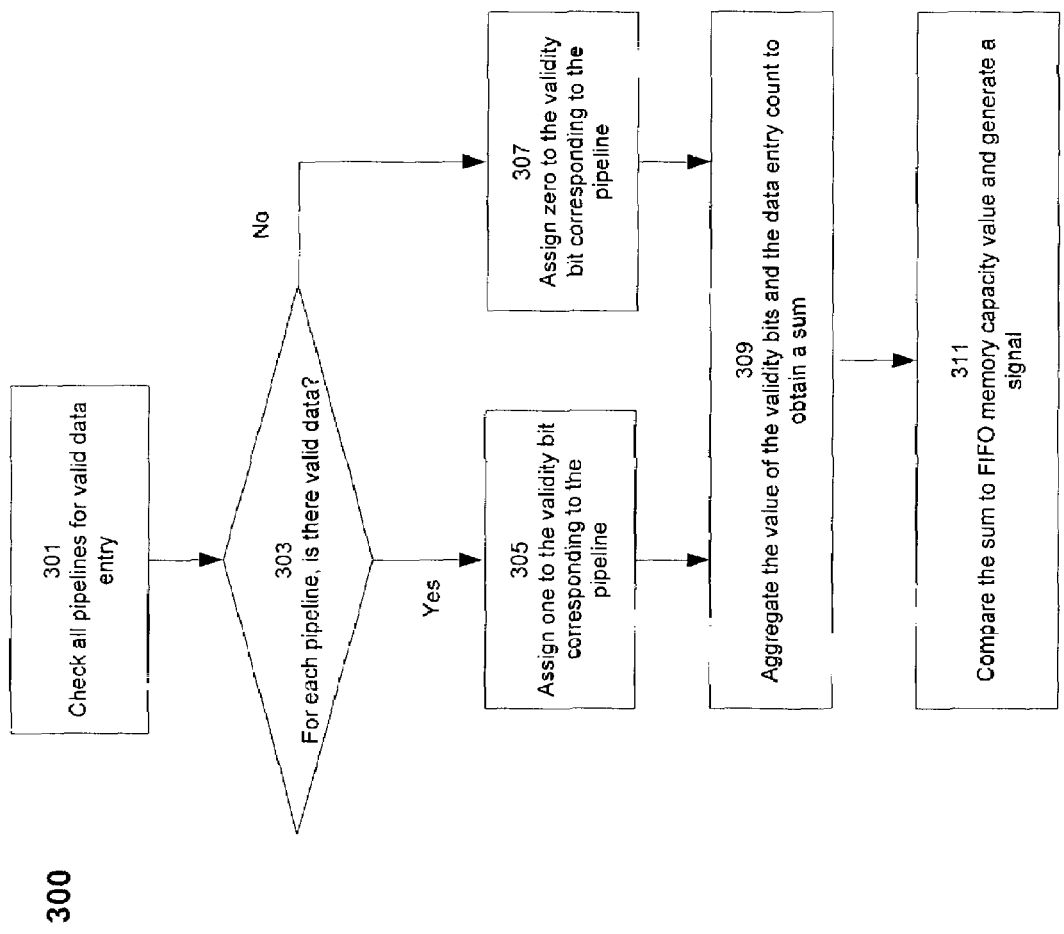
FIG. 3 is a flow chart diagram illustrating functional steps of an optimized full signal control circuit in accordance to one embodiment of the present invention.

FIG. 3 is a flow chart illustrating the functional steps of an optimized full signal control circuit in accordance to one embodiment of the present invention. In step 301, all pipelines that input to a FIFO memory are checked for valid data. For each pipeline, from step 303 to step 307, if a pipeline contains valid data, a corresponding validity bit is set to one. Conversely, if a pipeline does not contain data, a corresponding validity bit is set zero. Subsequently in step 309, the validity bits corresponding to the pipelines are aggregate with a count values received from an up-down counter to obtain a sum. The sum is then compared to the storage capacity of the FIFO memory in step 311 and a logical one is generated as output 221 if the sum and the value of the FIFO memory capacity equal. Conversely, a logical zero is generated as output 221 in step 311 where the sum does not equal to the value of the FIFO memory capacity.

Output 211 constitutes a full signal wherein the value of signal 211 indicates whether or not the FIFO memory is full. Output 213 constitutes an empty signal wherein the value of signal 213 indicates whether or not the count value generated by the up-down counter 211 is zero.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited to the particular use contemplated. It is intended that the scope of the invention be defined by the Claims appended hereto and their equivalents.

Figure 1:
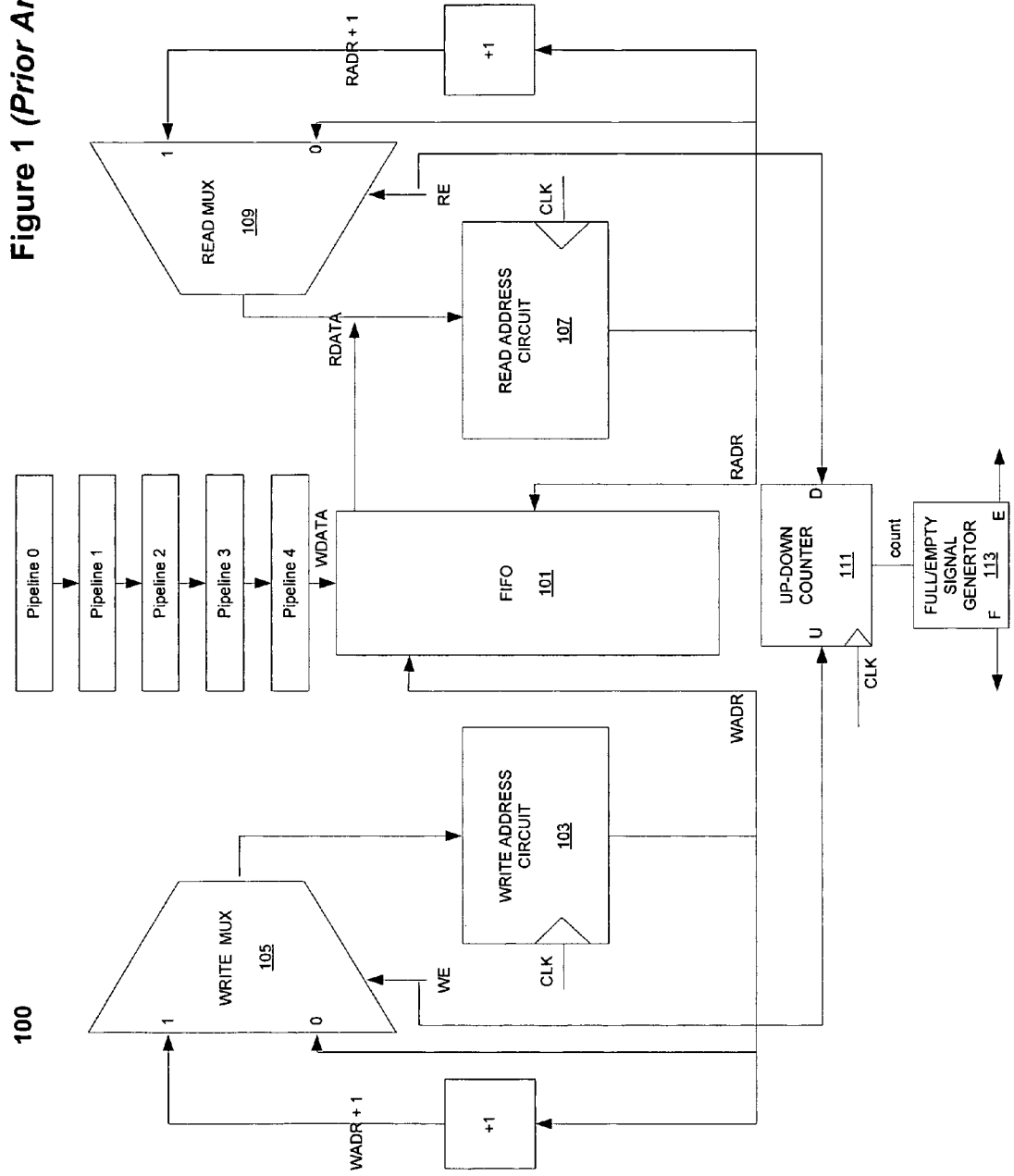
FIG. 1 is a prior art architectural diagram illustrating a conventional FIFO device.

For example, although five pipelines are illustrated in FIG. 1 and FIG. 2, one skilled in the art understands that a greater or fewer number of pipelines may be used in conjunction with the FIFO device according to desired design parameters.

I claim:

1. A method of generating a full signal used by a FIFO device, the method comprising:

checking one or more pipelines for valid data, wherein the one or more pipelines are coupled in a series, wherein the one or more pipelines may comprise data to be written to the FIFO device and wherein each of the one or more pipelines is coupled to each of one or more validity registers, each validity register storing a valid bit wherein the valid bit comprises a zero if the corresponding pipeline has no valid data, and wherein the valid bit comprises an one if the corresponding pipeline has valid data;

wherein the one or more validity registers are coupled in series;

adding a total number of pipelines comprising valid data to a count output of an up-down counter to produce a sum by aggregating the valid bit in each of the one or more validity registers with the count output, wherein data stored in each pipeline that is not a pipeline last in the series is piped to a pipeline next in the series at each clock cycle, and wherein the valid bit stored in each validity register that is not a validity register last in the series is piped to a validity register next in the series at each clock cycle;

comparing the sum to a storage capacity value of the FIFO device; and generating a full signal upon the sum equaling the storage capacity value of the FIFO device;

wherein the FIFO device receives data only from the pipeline last in the series;

wherein the up-down counter counts up at a clock cycle upon receiving an asserted write enable signal and counts down at a clock cycle upon receiving an asserted read enable signal.

2. The method of claim 1, further comprising generating a not-full signal upon the sum not equaling to the storage capacity of the FIFO device.

3. A full signal condition control circuit, comprising:

a FIFO device having a limited storage capacity;

an up-down counter coupled to the FIFO device wherein the up-down counter counts up at a clock cycle upon receiving an asserted write enable signal and wherein the up-down counter counts down at a clock cycle upon receiving an asserted read enable signal;

one or more pipelines coupled in series to the FIFO device, wherein each of the one or more pipelines may comprise data to be written to the FIFO device and wherein data stored in each pipeline that is not a pipeline last in the series is piped to a pipeline next in the series at each clock cycle;

one or more validity registers coupled in series, wherein each of the one or more valid ity registers is coupled to each of the one or more pipelines respectively and stores a valid bit, wherein the valid bit comprises a zero if the corresponding pipeline has no valid data, and wherein the valid bit comprises an one if the corresponding pipeline has valid data and wherein the valid bit stored in each validity register that is not a validity register last in the series is piped to a validity register next in the series at each clock cycle;

an adder for generating a sum, wherein the adder is coupled to the one or more validity registers for receiving a value of the valid bit from each of the one or more validity registers as one or more inputs; and coupled to the up-down counter for sending a count value to the adder as an input; and a comparator coupled to the adder for generating a full signal upon the sum equaling a storage capacity value of the FIFO device.

* * * * *